US009653989B2

(12) United States Patent
Ganor

(10) Patent No.: US 9,653,989 B2
(45) Date of Patent: May 16, 2017

(54) SUPPYING AN OUTPUT VOLTAGE USING UNSYNCHRONIZED DIRECT CURRENT TO DIRECT CURRENT CONVERTERS

(71) Applicant: Assaf Ganor, Hertzelia (IL)

(72) Inventor: Assaf Ganor, Hertzelia (IL)

(73) Assignee: DSP GROUP Ltd., Herzliya (IL)

( * ) Notice: Subject to any disclaimer, the term of this patent is extended or adjusted under 35 U.S.C. 154(b) by 676 days.

(21) Appl. No.: 13/956,390

(22) Filed: Aug. 1, 2013

(65) Prior Publication Data

US 2014/0035366 A1    Feb. 6, 2014

Related U.S. Application Data

(60) Provisional application No. 61/678,676, filed on Aug. 2, 2012.

(51) Int. Cl.
  *H02M 3/04*    (2006.01)
  *H02J 1/00*    (2006.01)
  *H02M 3/158*   (2006.01)

(52) U.S. Cl.
  CPC .......... *H02M 3/04* (2013.01); *H02J 1/00* (2013.01); *H02M 3/1584* (2013.01); *Y10T 307/305* (2015.04)

(58) Field of Classification Search
  CPC ..................................................... H02M 3/04
  See application file for complete search history.

(56) References Cited

U.S. PATENT DOCUMENTS

| | | | | |
|---|---|---|---|---|
| 6,052,790 A * | 4/2000 | Brown | ............... | H02M 3/156 323/267 |
| 7,489,117 B2 * | 2/2009 | Jain | ............... | H02M 3/158 323/224 |
| 7,609,040 B1 * | 10/2009 | Jain | ............... | H02M 3/1584 323/276 |
| 8,411,020 B2 * | 4/2013 | Yeh | ............... | G09G 3/3406 345/102 |
| 2012/0104862 A1 * | 5/2012 | Ito | ............... | H02S 40/32 307/82 |

* cited by examiner

*Primary Examiner* — Daniel Cavallari
*Assistant Examiner* — Daniel Kessie
(74) *Attorney, Agent, or Firm* — Reches Patents

(57) ABSTRACT

A system that may include a first direct current to direct current (DC) converter that is arranged to determine at a first determination rate whether to alter a parameter of operation of the first DC to DC converter and to selectively alter the parameter of operation of operation of the first DC to DC converter in response to the determination; and a second switched-mode DC to DC converter that is arranged to determine at a second determination rate whether to alter the parameter of operation of the second DC to DC converter and to selectively alter the parameter of operation of operation of the second DC to DC converter in response to the determination. The second determination rate is higher by at least a factor of two than the first determination rate. The first and second DC to DC converters are mutually unsynchronized.

14 Claims, 11 Drawing Sheets

SUPPYING AN OUTPUT VOLTAGE USING UNSYNCHRONIZED DIRECT CURRENT TO DIRECT CURRENT CONVERTERS

RELATED APPLICATIONS

This application claims priority from U.S. provisional patent Ser. No. 61/678,676 having a filing date of Aug. 2, 2012 which is incorporated by reference.

BACKGROUND OF THE INVENTION

A direct current (DC) to direct current (DC) converter converts a source of direct current (DC) from one voltage level to another. When converting an input voltage to a higher level the circuit is called a "boost" or step-up converter, and when converting into a lower level it is called a "buck" or step-down converter.

There are several types of DC to DC converters. One known DC to DC converter is a switched-mode DC to DC converter that converts DC voltage of a first level from a DC power supply by controlling a switch that may be closed to selectively allow the provision of input power (from the DC power supply) to storing the input energy temporarily in an energy storage component (such as an inductor and/or a capacitor) that releases that energy to the output of the DC to DC converter at a different level.

FIG. 1

FIG. 1 illustrates a prior art DC-DC converter 10. It includes DC power supply 11, switch 12, diode 13, inductor 14, capacitor 15, output ports 16, measurement circuit (such as voltmeter 17) and controller 18. The controller 18 controls the switch 12 in response to the value of output voltage Vo. DC to DC converter 10 is connected to a load 20.

FIG. 2

FIG. 2 illustrates some waveforms generated during the operation of DC to DC converter 10.

The switch 12 is kept closed during switch ON times ($T_{ON}$ 21 of FIG. 2) and this causes the inductor 14 to experience a forward voltage drop $V_L=V_i-V_O$ (as illustrates by graph 23) which causes the inductor 14 to be charged with energy (from power supply 11) and the current on the inductor 14 increases linearly (graph 24) assuming the inductor 14 does not reach saturation.

The switch 12 is opened during switch OFF times ($T_{OFF}$ 22 of FIG. 2) and this causes diode 13 to conduct and thus the voltage drop $V_L$ on inductor 14 is negative $V_L=V_D-V_O$. During this time period the inductor's energy keeps a flow of current into the load 20, but this current decreases linearly as well (graph 24).

The average current the buck circuit can provide to the output load is shown in the diagram as $I_{AVG}$ 25. Adjusting the circuit parameters such as duty cycle and frequency of the switch 12 may change the available current to the output load. If the average output load is smaller than this average current then voltage will increase beyond required level and it will fall below it when the output load is smaller. For this reason, in order to keep a constant output voltage level a closed loop mechanism is typically implemented.

Closed Loop Mechanism.

A popular way of implementing a closed loop mechanism for keeping a stable output voltage level is by using "ON-OFF switching" mechanism. The average inductor current $I_{AVG}$ 25 is higher than the average load current $I_{load}$ causing the output voltage $V_O$ to increase when the switching mechanism is on.

The output voltage Vo is sensed by the circuit and when voltage rises above a certain threshold the switching mechanism is stopped allowing the voltage to drop as a result of the output load. This is referred to as "Inactive Period" (Denoted 32 in FIG. 3). After the output voltage drops below a certain threshold the switching mechanism is turned on again. This is referred to as "Active Period" (denoted 31 in FIG. 3).

FIG. 3

Prior art waveforms related to the activation of a prior art switched mode DC to DC converter are illustrated in FIG. 3. For simplicity the output load is shown as constant.

The output voltage (Vo) 34 exhibits ripples that result from several factors in the system such as the hysteresis of the voltage threshold detection mechanism, the difference between $I_{AVG}$ and $I_{LOAD}$ and switching frequency.

One way of reducing output ripple is to adjust the duty cycle of the switch control in order to reduce the difference between these currents and reduce the slope of $V_O$. When the average output current during $T_{ON}$ is lower than the average load current then the load is in starvation and the converter cannot meet the load demand. In this case the output voltage will fall below its target.

In many electronic systems there is a dedicated ASIC component that is responsible for providing power to the different consumers. This component is referred to as Power Management Unit (PMU). As designs become more advanced the typical consumer requires increasingly larger current form the system. A typical PMU in portable application systems has several voltage converters (DC-DC modules) that convert battery voltage to different voltage levels to meet the system power demands.

As mentioned above, a given DC-DC converter can provide a certain amount of current to the load. If load is larger than the maximum average current the circuit can provide the consumer will be in starvation. In this case the closed loop mechanism will be in "Active" mode constantly.

Traditionally, if the PMU does not have a single DC-DC converter that can meet the demand of a consumer then an external component must be purchased and integrated into the system, increasing the system cost and printed circuit board (PCB) area.

Even though the PMU may have several different DC-DC converters that the sum of their available current is enough to meet the consumer demand it is not possible to simply connect them together to supply the demand. Several tests in the lab show that this can lead to output voltage instability, decreased efficiency and might cause damage to the PMU.

Some PMUs can solve this issue by synchronizing the control signals of several DC-DC converters, effectively joining them together into one big DC-DC converter with the combined size of the switches and inductor components. This, however, requires additional logic that increases cost of the PMU, and might not be available in any given PMU component.

FIG. 4

FIG. 4 illustrates typical prior art waveforms 41, 42, 43, 44, 45, 47 and 48 generated in relation to a scenario in which a load may be in a state of starvation (lack of current illustrated by regions 46). The current (44) supplied by the DC to DC converter to the load is not enough to provide the demand from the load (45). As a result the voltage Vo (42) starts to drop below the desired voltage level Vtarget (41) during the OFF period of the switch $T_{OFF}$ when $I_{AVG}$ falls below $I_{LOAD}$—as illustrated by areas 44. Graph 47 illustrates a switch control signal ("switch state") that toggles the switch of the DC to DC converter and also illustrates an ON_CTL signal (48) that shows that the switch is toggled during the entire duration.

Avoiding Oscillation on Output Voltage

Traditionally, there is a risk that two different DC to DC converters that are controlled by separate controllers and are coupled in parallel to each other (to provide the same output voltage) might cause the output voltage to oscillate.

This is the reason that traditionally using several DC-DC converters in parallel requires synchronization of the switching elements of each DC to DC converter, which complicates the design of the DC to DC converters and increases the overall cost.

FIG. 5

FIG. 5 illustrates various waveforms generated when using two DC-DC converters with close frequencies and similar current rating.

During time periods 52 the output voltage 53 is below the voltage threshold low hysteresis level, and during periods 51 the output voltage is above the high hysteresis level. The low hysteresis level is slightly below Vtarget and the high hysteresis level is slightly above Vtarget.

In each rising edge of the respective DC-DC converter a switching operation occurs if the output voltage is below the low hysteresis point (periods 51) and stops if it is above the high point (periods 52).

The bandwidth of a DC-DC converter is limited by the frequency of the switching. The decision point whether to close the switch comes usually at the beginning of each switch period.

The diagram shows output voltage instability (large Vo fluctuations) due to the fact that both controllers might decide to perform a switch in the same time while the current that is transferred to the output is a sum of both of them. Graphs 54, 55, 56, 57, 58, 59 and 59' represent the current drained from a first DC to DC converter, the load current, the current drained from a second DC to DC converter, a first switch state control signal, a control signal that determines whether to toggle the first switch, a second switch state control signal, and control signal that determines whether to toggle the switch first switch, respectively.

There is a need to provide an efficient system and method for operating multiple DC to DC converters.

SUMMARY

According to an embodiment of the invention there may be provided a system that may include: (i) a first switched-mode direct current to direct current (DC) converter that is arranged to selectively toggle a first switch at a first switching rate; wherein the first switch is coupled between a first power supply and energy storage components of the first DC to DC converter; a second switched-mode DC to DC converter that is arranged to selectively toggle a second switch at a second switching rate; wherein the second switch is coupled between a second power supply and energy storage components of the second DC to DC converter; wherein the second switching rate is higher by at least a factor of two than the first switching rate; and wherein the first and second switched-mode DC to DC converters are mutually unsynchronized.

According to an embodiment of the invention there may be provided a method for providing an output voltage to a load, the method may include: (i) for each cycle of operation of a first direct current (DC) to DC converter: (i.1) toggling a first switch at a first switching rate during the cycle of operation of the first DC to DC converter if at a certain point in the cycle of operation of the first DC to DC converter the output voltage is below a third voltage threshold; wherein the first switch is coupled between a first power supply and energy storage components of the first DC to DC converter; (i.2) maintaining, by the first DC to DC converter the first switch open if at the certain point in the cycle of operation of the first DC to DC converter the output voltage is above a fourth voltage threshold; (ii) for each cycle of operation of a second DC to DC converter: (ii.1) toggling a second switch at a second switching rate during the cycle of operation of the second DC to DC converter if at a certain point in the cycle of operation of the second DC to DC converter the output voltage is below a first voltage threshold; wherein the second switch is coupled between a second power supply and at least one energy storage components of the second DC to DC converter; (ii.2) maintaining, by the second DC to DC converter the second switch open if at the certain point in the cycle of operation of the second DC to DC converter the output voltage is above a second voltage threshold; wherein the second switching rate is higher by at least a factor of two than the first switching rate; and wherein the first and second switched-mode DC to DC converters are coupled in parallel to each other and are mutually unsynchronized.

According to an embodiment of the invention there is provided a system that includes a first direct current to direct current (DC) converter that is arranged to determine at a first determination rate whether to alter a parameter of operation of the first DC to DC converter and to selectively alter the parameter of operation of operation of the first DC to DC converter in response to the determination; a second switched-mode DC to DC converter that is arranged to determine at a second determination rate whether to alter the parameter of operation of the second DC to DC converter and to selectively alter the parameter of operation of operation of the second DC to DC converter in response to the determination; wherein the second determination rate is higher by at least a factor of two than the first determination rate; and wherein the first and second DC to DC converters are mutually unsynchronized.

The second determination rate (rate in which the DC to DC converter determines whether to change a parameter) is higher than the first determination rate. The second determination rate may be higher than the first determination rate by a degree that will reduce the output voltage ripple. It may be higher by a factor of 2, 3, 4, 5 and more. The factor may be a positive integer but can also be a non-integer number. It is expected that an increase of the ratio will result in lower output voltage oscillation.

The parameter of operation may be a switching rate, a duty cycle, or any parameter that may affect the provision of the output voltage.

According to an embodiment of the invention there is provided a method for providing an output voltage to a load, the method may include: determining, by a first direct current (DC) to DC converter, at a first determination rate whether to alter a parameter of operation of the first DC to DC converter; selectively altering the parameter of operation of operation of the first DC to DC converter in response to the determination; determining, by a second direct current (DC) to DC converter, at a second determination rate whether to alter a parameter of operation of the second DC to DC converter; selectively altering the parameter of operation of operation of the second DC to DC converter in response to the determination; wherein the second determination rate is higher by at least a factor of two than the first determination rate; and wherein the first and second DC to DC converters are coupled in parallel to each other and are mutually unsynchronized.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
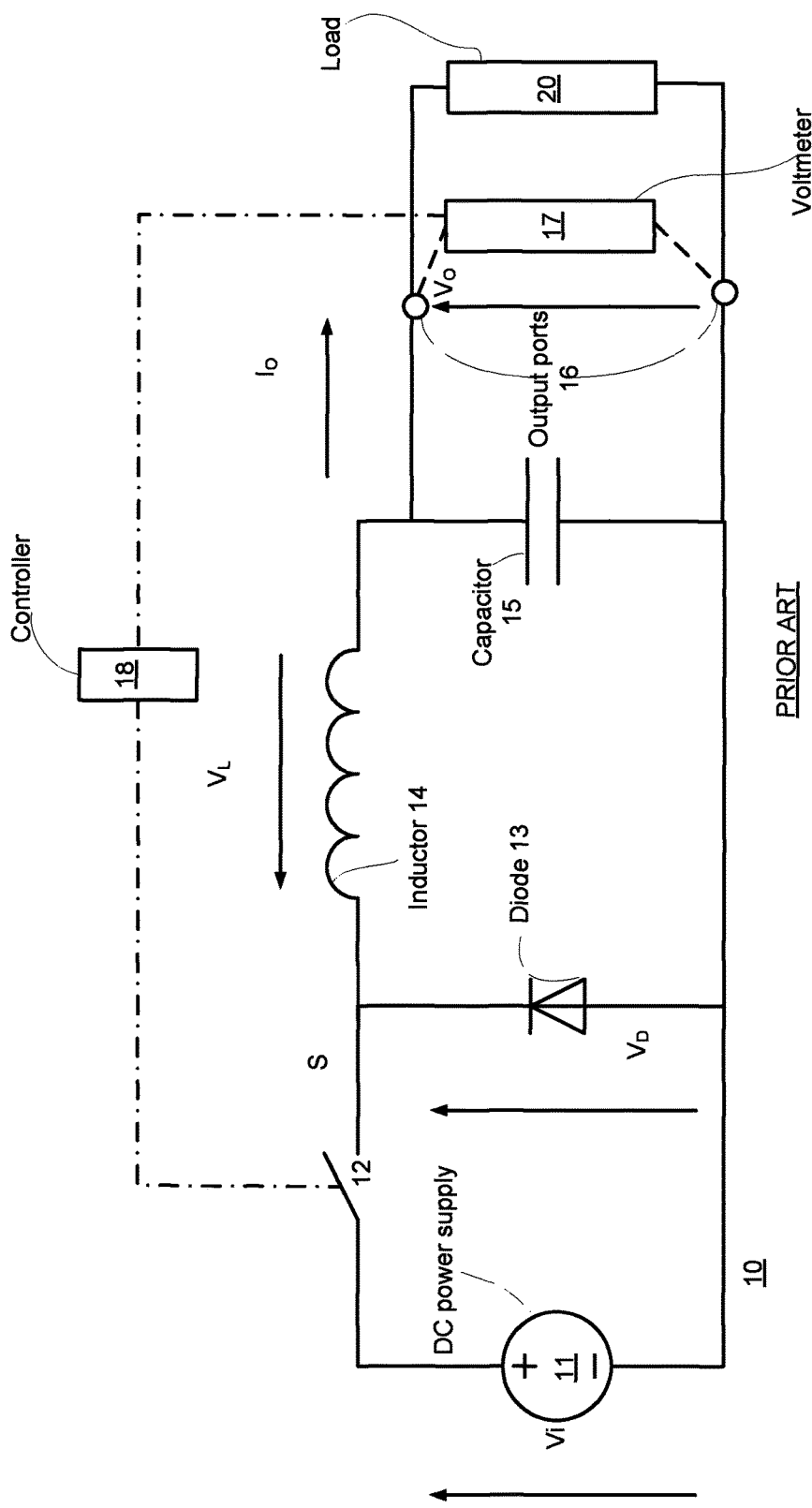
FIG. 1 illustrates a prior art DC to DC converter.
Figure 2:
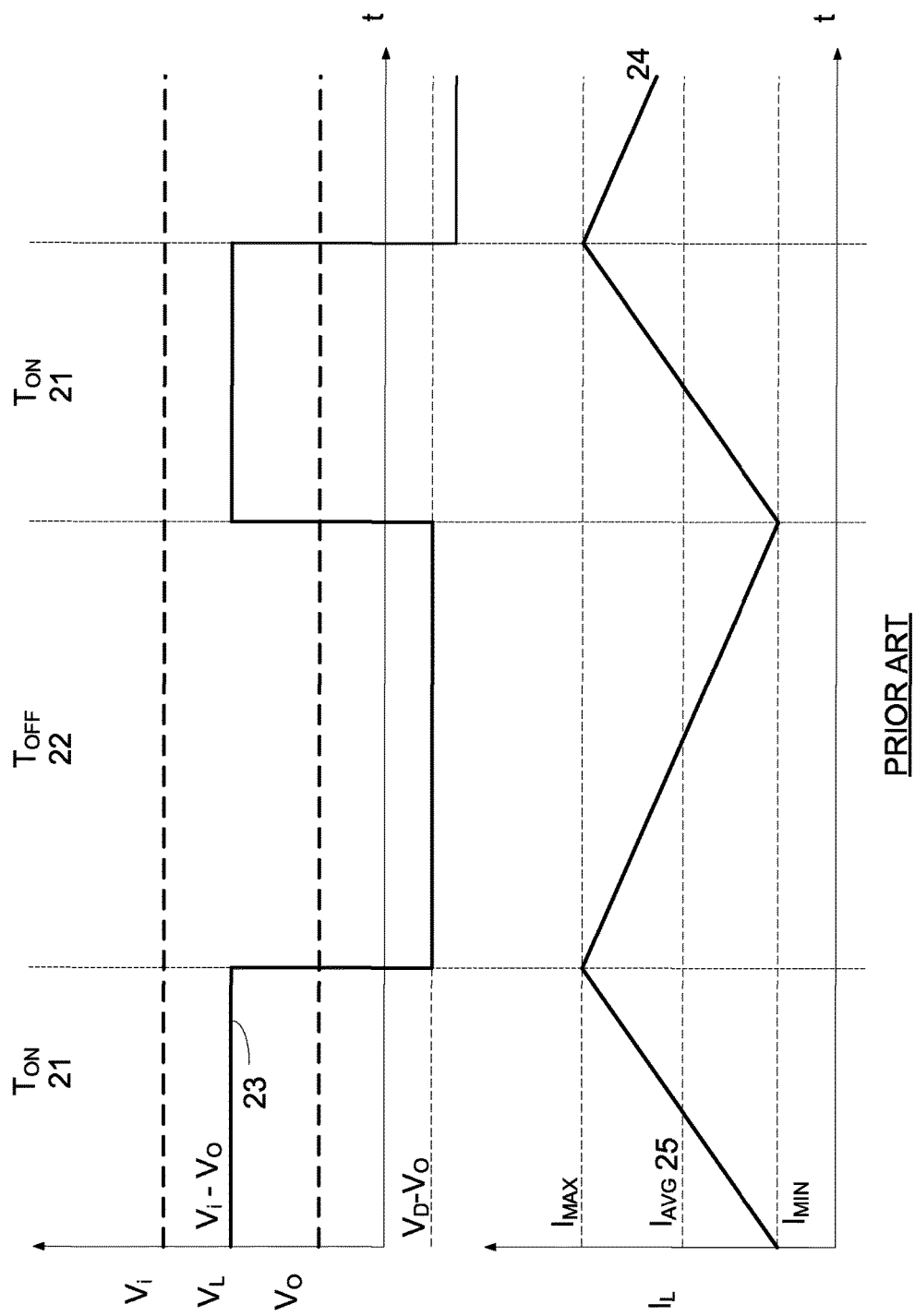
FIG. 2 illustrates prior art waveforms.
Figure 3:
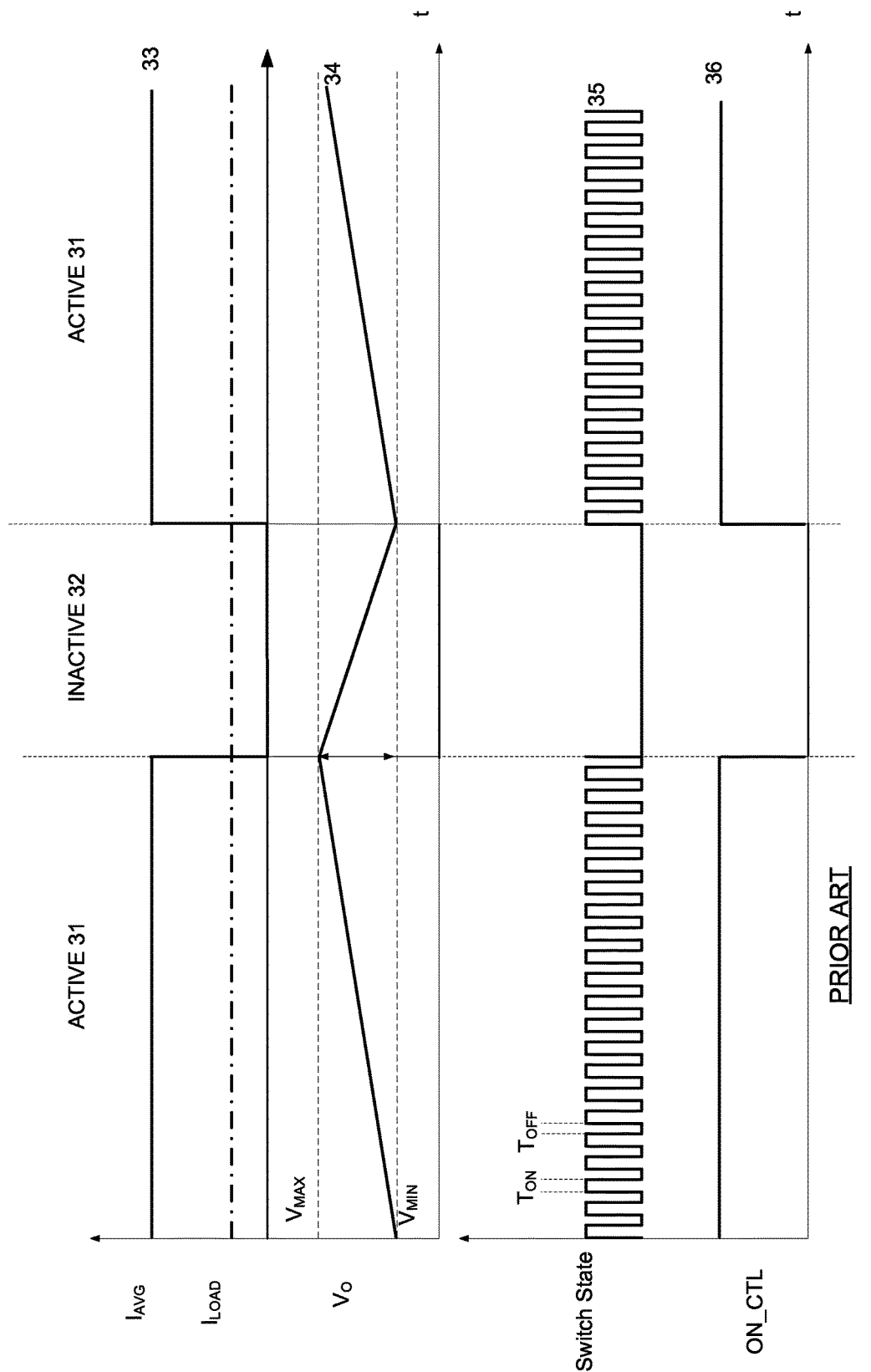
FIG. 3 illustrates prior art waveforms.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Although the following examples refer to switched-mode DC to DC converters it is applicable to other types of DC to DC converters.

There is provided a system and a method. The system includes multiple switched mode DC to DC converters wherein the switching rates of different switched mode DC to DC converters differ from each other by at least two (especially—by at least five).

For each pair of switched mode DC to DC converters one switched mode DC to DC converter will be a fast switched mode DC to DC converter and the other will be a slow switched mode DC to DC converter. The fast switched mode DC to DC converter reacts much faster to changes in the output voltage and/or output current (faster in relation to the slow switched mode DC to DC converter). The fast switched mode DC to DC converter switches to inactive state as soon as the voltage starts to increase, and by this avoiding oscillation.

The switching frequencies of switched mode DC to DC converters may be far apart from each other in a way that a fast switched mode DC to DC converter sees the slower switched mode DC to DC converter as providing DC. It has been shown that a ratio of five between the switching rates of the switched mode DC to DC converters gives good performance.

Each switched mode DC to DC converter may have over-current protection circuits that will limit the current it can output. For example, the duty cycle of each switched mode DC to DC converter may be limited in a way that prevents damage to the internal switching elements of the inductor when the switched mode DC to DC converter provides its maximum current.

When a current required by the load exceeds a certain level (that is characteristic of the first DC to DC converter) the output voltage starts to drop. As a result the fast switched mode DC to DC converter enters an ACTIVE mode and starts to toggle its switch. The added current from the fast switched mode DC to DC converter ensures that the current provided by the system is higher than $I_{LOAD}$ and as a result the output voltage remains stable.

In order to minimize output voltage ripple, voltage threshold levels of different switched mode DC to DC converters may be similar to each other. Small inaccuracy of voltage levels between the switched mode DC to DC converters may increase output ripple.

FIG. 8

Figure 8:
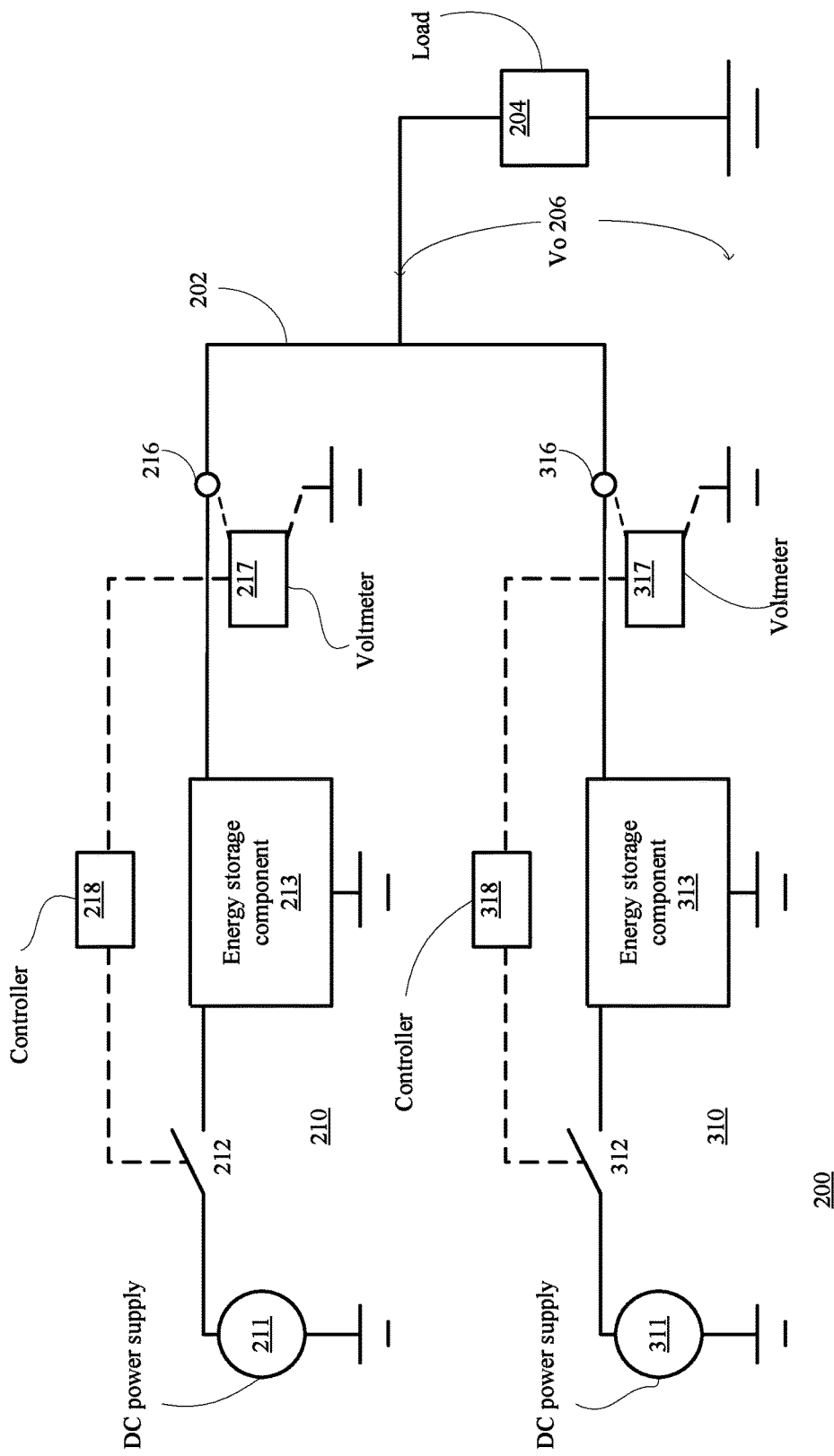
FIG. 8 illustrates a device according to an embodiment of the invention.

FIG. 8 illustrates system 200 according to an embodiment of the invention.

System 200 may be an integrated circuit, a power management module, a chip set, a mobile device, a computer and the like.

System 200 includes:
a. A first switched-mode direct current to direct current (DC) converter 210 that is arranged to selectively toggle a first switch 212 at a first switching rate. The first switch 212 is coupled between a first power supply 211 and one or more energy storage components 213 of the first DC to DC converter (the energy storage components may be an inductor and a capacitor). The one or more energy storage components are coupled to a first output port 216 to provide an output voltage. The first switched mode DC to DC converter also has a first controller 218 that is connected to a first voltmeter 217 and controls the first switch 212.

b. A second switched-mode DC to DC converter 310 that is arranged to selectively toggle a second switch 312 at a second switching rate. The second switch 312 is coupled between a second power supply 311 and one or more energy storage components 313 of the second DC to DC converter 310. The one or more energy storage components 313 are coupled to a second output port 316 to provide an output voltage. The second switched mode DC to DC converter also has a second controller 318 that is connected to a second voltmeter 317 and controls the second switch 312.

The first and second switched-mode DC to DC converters 210 and 310 are mutually unsynchronized. Each switched mode DC to DC converter (out of 210 and 310) operates in a cyclic manner and these cycles are not synchronized. At a certain time of each cycle (for example—the beginning of each cycle) each DC to DC converter decided whether to toggle its switch (if it should supply voltage) or not.

Figure 6:
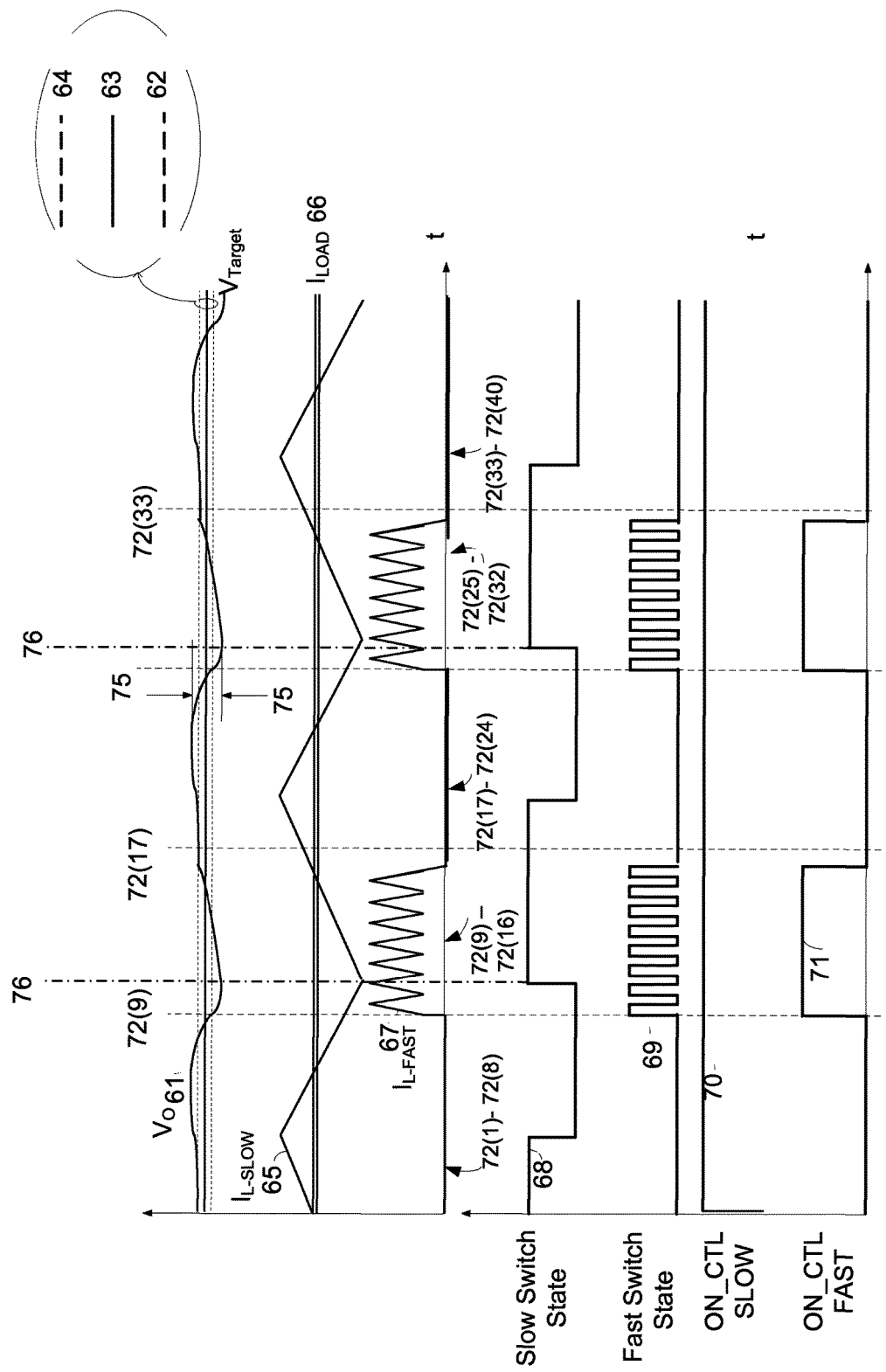
FIG. 6 illustrates waveforms according to an embodiment of the invention.
Figure 7:
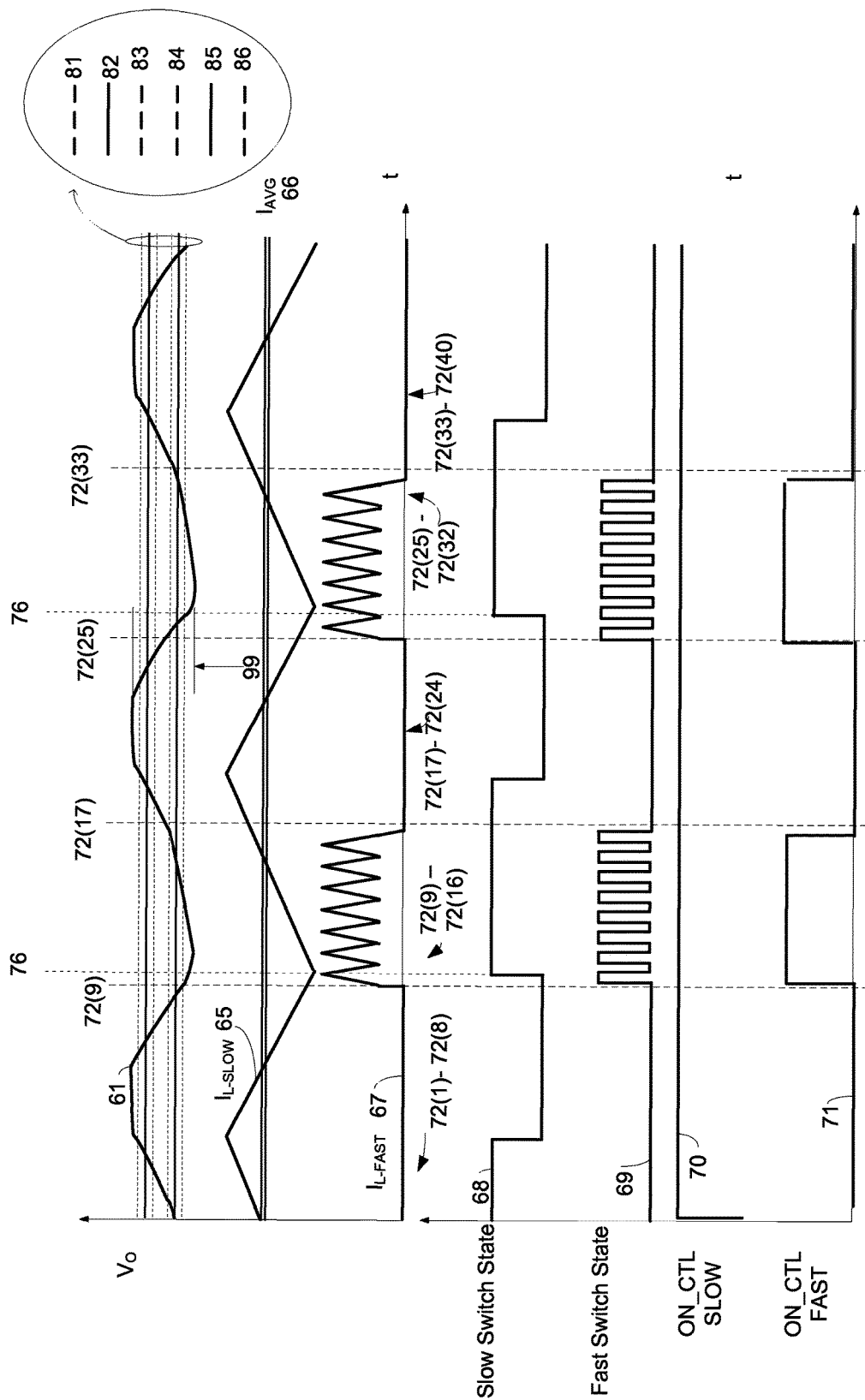
FIG. 7 illustrates waveforms according to an embodiment of the invention.

Reference number 76 of FIGS. 6 and 7 illustrates the beginning of cycles of the first switched mode DC to DC converter and reference numbers 72(1)-72(35) of FIGS. 6 and 7 illustrates the beginning of cycles of the second switched mode DC to DC converter. These points of time can be time shifted from each other but may occasionally overlap.

Each of the first and second switched mode DC to DC converters 210 and 310 can equal (or at least resemble) DC to DC converter 10 of FIG. 1.

The first switched mode DC to DC converter 210 has a first output port 216 and the second switched mode DC to DC converter 310 has a second output port 316. These output ports 216 and 316 can be connected in parallel to each other by coupling elements 202 that may belong to system 200 (as illustrated in FIG. 8) or not belong to system 200 (for example—if system 200 is an integrated circuit and the coupling elements 202 are conductors of a printed circuit board (PCB) coupled to the integrated circuit. The coupling element 202 provides output voltage Vo 206 to load 204.

The second switching rate is higher than the first switching rate. The second switching rate may be higher than the first switching rate by a degree that will reduce the output voltage ripple. It may be higher by a factor of 2, 3, 4, 5 and more. The factor may be a positive integer but can also be a non-integer number. It is expected that an increase of the ratio will result in lower output voltage oscillation.

The difference between the first and second switching rates may allow the first switched mode DC to DC converter 210 to supply voltage to the load virtually regardless of the second switched mode DC to DC converter 310 and allow the second switched mode DC to DC converter 310 to supply voltage only when the supply of power by the first switched mode DC to DC converter 210 is not enough—and the load may enter a starvation.

At a certain time of each cycle of the first switched mode DC to DC converter, the first switched mode DC to DC converter 210 determines whether to (i) enter an ACTIVE mode (and to toggle the first switch 212 at the first switching rate) or (ii) leave its first switch open during the entire cycle (this may involve entering an INACTIVE mode).

The determination includes comparing output voltage Vo 206 to a third voltage threshold TH3. If Vo is lower than TH3 than the first switched mode DC to DC converter 210 enters the ACTIVE mode. If Vo exceeds a fourth voltage threshold TH4—it leaves its first switch open during the entire cycle (enters or stays in INACTIVE mode).

TH3 may equal TH4 or may differ from TH4. TH4 may be higher than TH3 to provide a hysteresis loop.

At a certain time of each cycle of the second switched mode DC to DC converter, the second switched mode DC to DC converter 310 determines whether to (i) enter an ACTIVE mode (and to toggle the second switch 312 at the second switching rate) or (ii) leave its second switch open during the entire cycle (this may involve entering an INACTIVE mode).

The determination includes comparing output voltage Vo 206 to a first voltage threshold TH1. If Vo is lower than TH1 than the second switched mode DC to DC converter 210 enters the ACTIVE mode. If Vo exceeds a second voltage threshold TH2—it leaves its second switch open during the entire cycle.

TH1 may equal TH2 or may differ from TH2. TH2 may be higher than TH1 to provide a hysteresis loop.

TH1 may equal TH3 or may differ from it. TH2 may equal TH4 or may differ from it. According to an embodiment of the invention TH1 does not exceed TH3 and additionally or alternatively, TH2 does not exceed TH4.

The operation of switched mode DC to DC converters 210 and 310 will be further illustrated by FIGS. 6 and 7.

FIG. 6

In FIG. 6 TH1 equals TH3 and both are denoted 62. TH2 equals TH4 and both are denoted 64.

Figure 4:
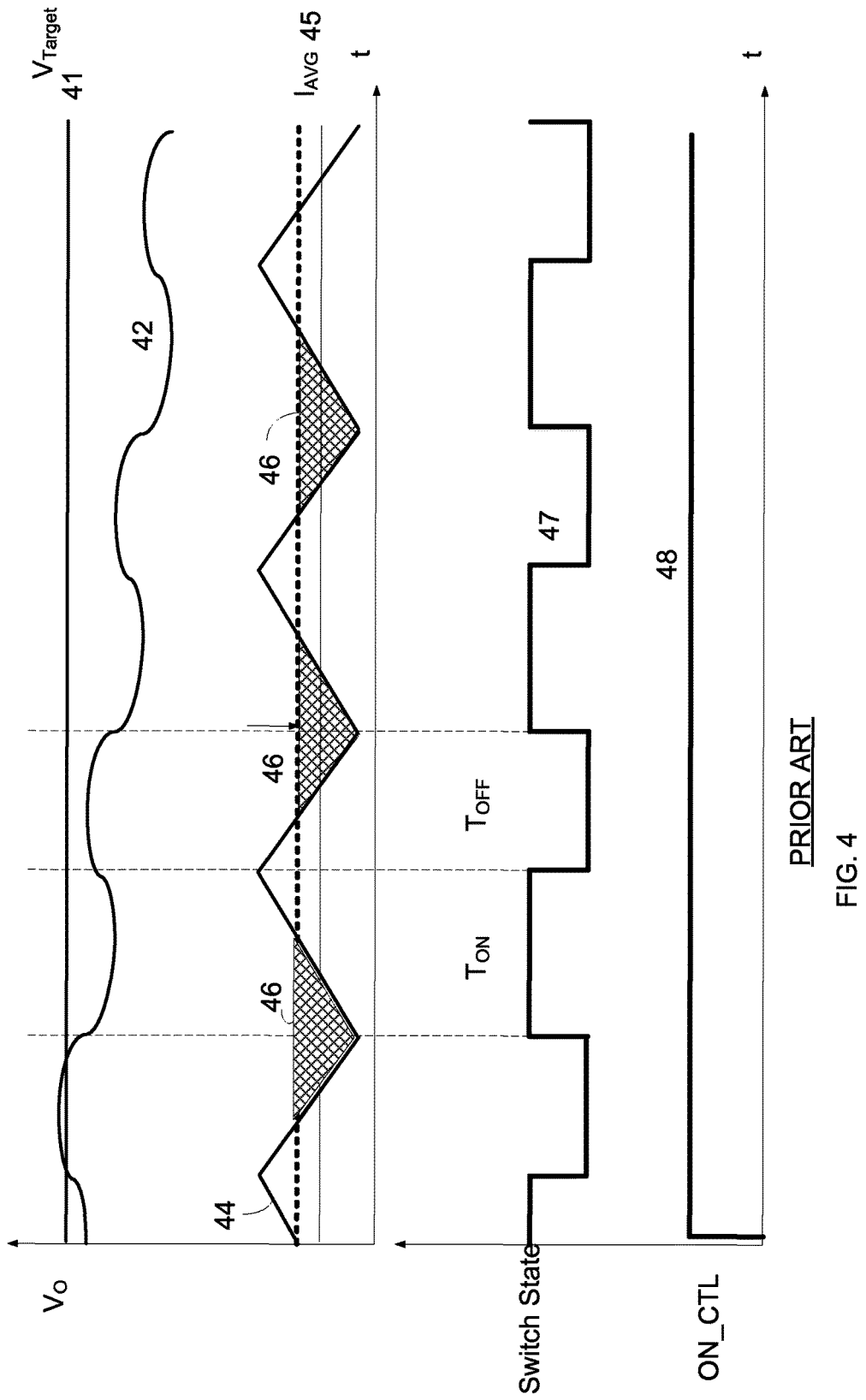
FIG. 4 illustrates prior art waveforms.
Figure 5:
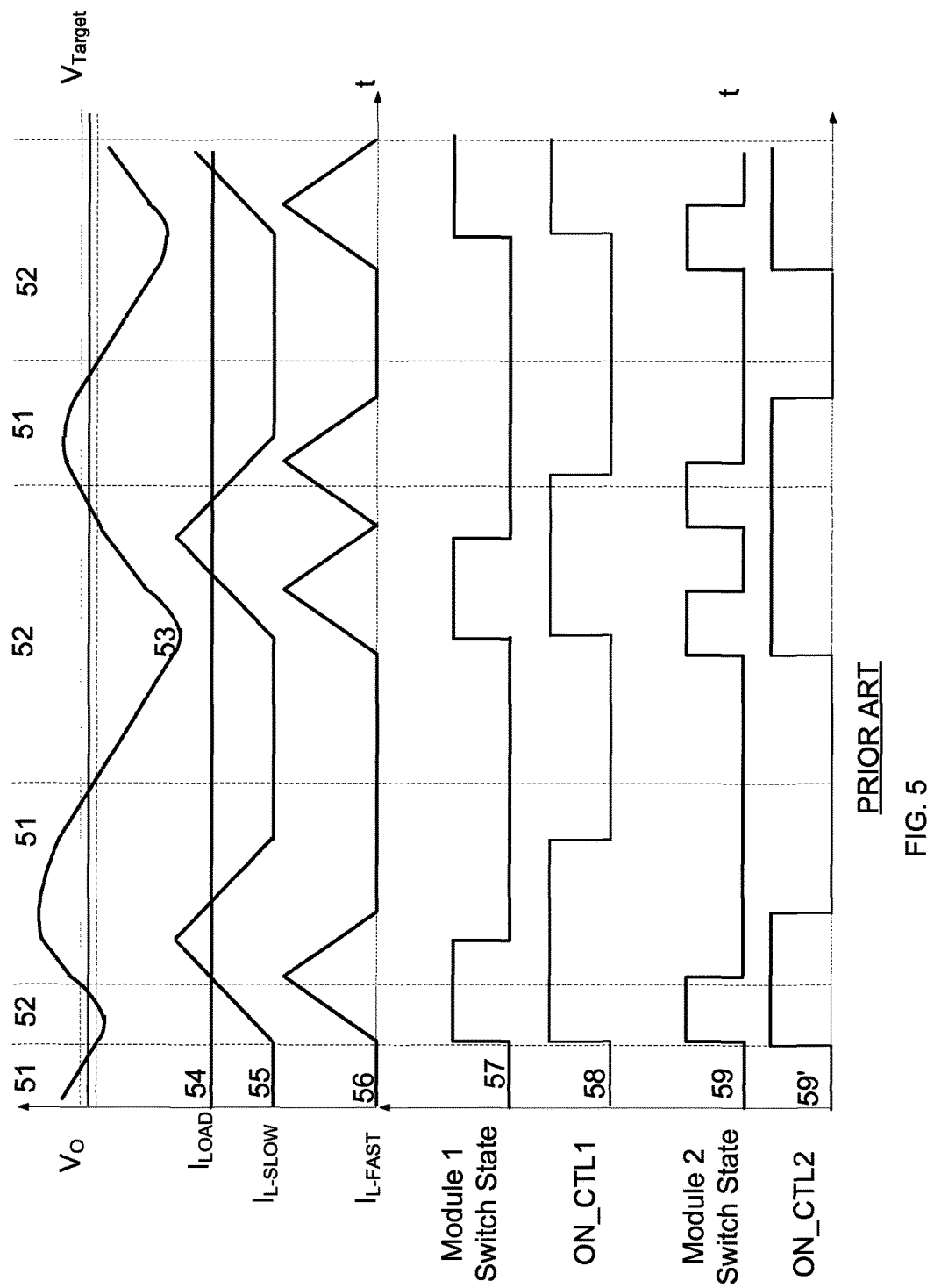
FIG. 5 illustrates prior art waveforms.

In FIG. 6 Vo 61 fluctuates (output voltage ripple denoted 75) about a target voltage Vtarget 63. The ripples are significantly lower than those illustrated in FIGS. 4 and 5.

The current 65 supplied by the first DC to DC converter 210 linearly rises during ACTIVE periods of the first switched mode DC to DC converter 210 and linearly decreased during INACTIVE periods.

At the beginning (76) of each cycle of the first switched mode DC to DC converter 210 Vo is lower than TH3 62 and thus the first switched mode DC to DC converter 210 enters an ACTIVE mode—as illustrated by control signal 70 (ON_CTL SLOW). The first switch toggles at a first switching rate—as illustrated by Slow Switch State signal 68. The first switched mode DC to DC converter 210 enters an INACTIVE mode once Vo exceeds TH4 64.

At the beginning of cycles 72(8)-72(14) and 72(22)-72(28) of the second switched mode DC to DC converter 310 Vo is lower than TH1 62 and the second switched mode DC to DC converter 310 enters an ACTIVE mode—as illustrated by control signal 71 (ON_CTL FAST). The second switch toggles at a second switching rate—as illustrated by Fast Switch State signal 69. In the beginning of these cycles Vo lowers to a level that indicates that the provision of voltage by the first switched mode DC to DC converter 210 is not enough—and that the second switched mode DC to DC converter 310 should assist in the provision of voltage to the load. At the beginning of cycles 72(1)-72(7), 72(15)-72(21) and 72(29)-72(35) of the second switched mode DC to DC converter 310 Vo is higher than TH2 64 and thus the second switched mode DC to DC converter 310 leave its second switch open during the entire cycle—as illustrated by control signal 71 (ON_CTL FAST). The second switch does not toggle—as illustrated by Fast Switch State signal 69.

FIG. 7

In FIG. 7 TH1<TH2<TH3<TH4. TH1 is denoted 86, TH2 is denoted 84, TH3 is denoted 83 and TH4 is denoted 81.

Thus—there are two hysteresis loops—one for each switched mode DC to DC converter.

In FIG. 7 Vo 61 fluctuates (output voltage ripple denoted 99). The ripples are significantly lower than those illustrated in FIGS. 4 and 5.

The current 65 supplied by the first DC to DC converter 210 linearly rises during ACTIVE periods of the first switched mode DC to DC converter 210 and linearly decreased during INACTIVE periods.

At the beginning (76) of each cycle of the first switched mode DC to DC converter 210 Vo is smaller than TH3 83 and thus the first switched mode DC to DC converter 210 enters an ACTIVE mode—as illustrated by control signal 70 (ON_CTL SLOW). The first switch toggles at a first switching rate—as illustrated by Slow Switch State signal 68. The first switched mode DC to DC converter 210 enters an INACTIVE mode once Vo exceeds TH4 81.

At the beginning of cycles 72(8)-72(13) and 72(20)-72(25) of the second switched mode DC to DC converter 310 Vo is lower than TH1 86 and thus the second switched mode DC to DC converter 310 enters an ACTIVE mode—as illustrated by control signal 71 (ON_CTL FAST). The second switch toggles at a second switching rate—as illustrated by Fast Switch State signal 69.

In the beginning of these cycles Vo lowers to a level that indicates that the provision of voltage by the first switched mode DC to DC converter 210 is not enough—and that the second switched mode DC to DC converter 310 should assist in the provision of voltage to the load. The second switched mode DC to DC converter 310 enters an INACTIVE mode once Vo exceeds TH2 84.

At the beginning of cycles 72(1)-72(7), 72(14)-72(19) and 72(26)-72(31) of the second switched mode DC to DC converter 310 Vo is higher than TH2 84 and thus the second switched mode DC to DC converter 310 leave its second switch open during the entire cycle—as illustrated by control signal 71 (ON_CTL FAST). The second switch does not toggle—as illustrated by Fast Switch State signal 69.

Although the previous text refers to two switched mode DC to DC converters there can be provide more than two switched DC to DC converters—and the relationships between these switching rates resemble (in the sense of being different from each other) the ratios between the switching rates of the first and second switched mode DC to DC converters.

FIG. 9

Figure 9:
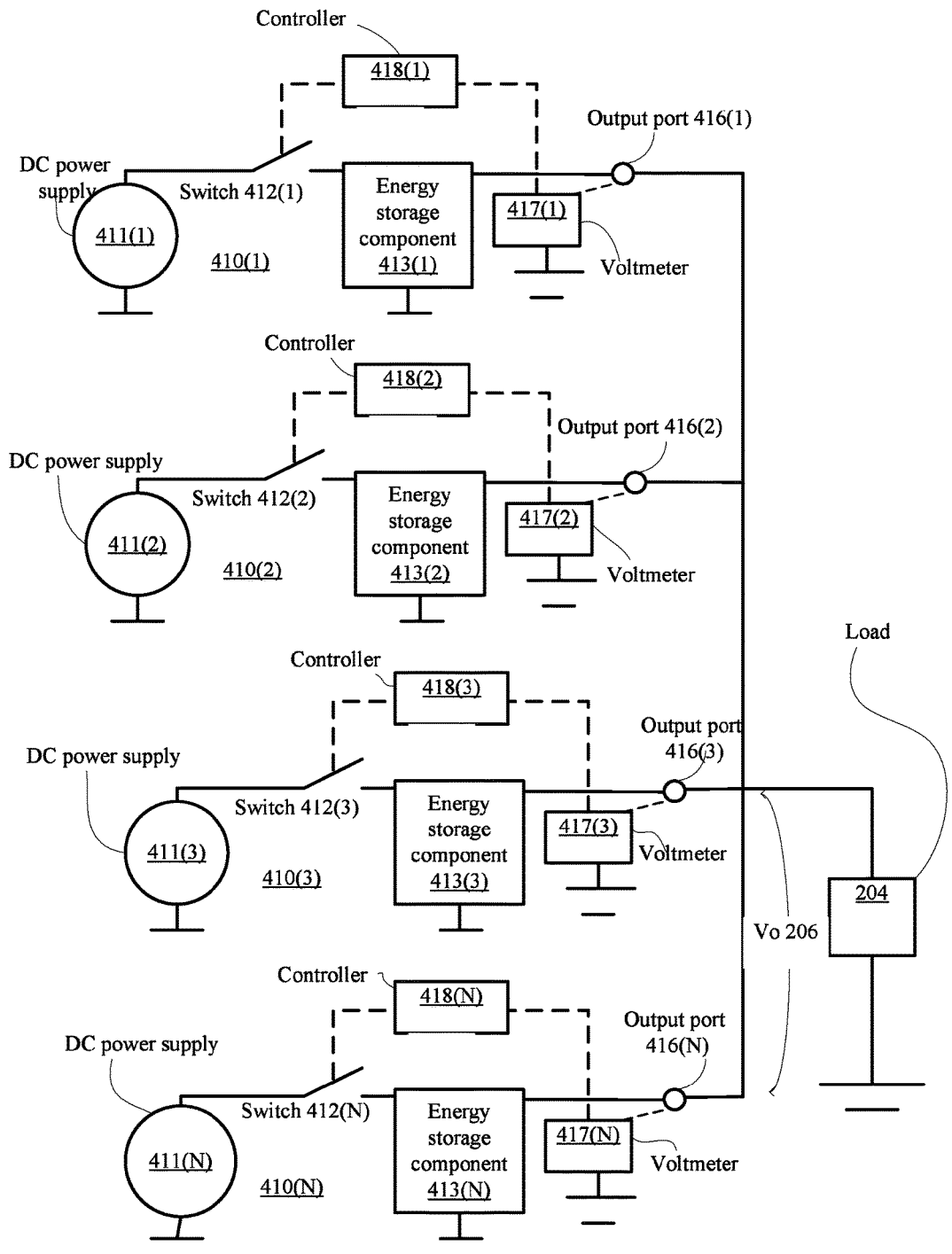
FIG. 9 illustrates a device according to an embodiment of the invention.

FIG. 9 illustrates system 400 according to an embodiment of the invention.

System 400 includes N Switched Mode DC To DC Converters SMDTDC(1)-SMDCTDC(N) 410(1)-410(N), wherein N is an integer that exceeds two. In FIG. 9 N exceeds three.

SMDTDC(1) 410(1) is a first switched mode DC to DC converter. SMDTDC(2) 410(2) is a second switched mode DC to DC converter. And SMDTDC(3) 410(3) is a third switched mode DC to DC converter.

Switched mode DC to DC converters SMDTDC(1)-SMDCTDC(N) 410(1)-410(N) have switching rates of SR(1)-SR(N), respectively.

Index n ranges between 1 and N. For each n that exceeds one SR(n)=SR(n−1)×F(n), wherein F(n) exceeds one (and may exceed 2, 3, 4, 5 and even more).

Each one of switched mode DC to DC converters SMDTDC(1)-SMDCTDC(N) 410(1)-410(N) may resemble switched mode DC to DC converter 10 of FIG. 1.

The n'th switched mode DC to DC converter SMDCTDC(n) 410(n) may selectively toggle an n'th switch 412(n) at an SN(n) switching rate. The n'th 412(n) is coupled between an n'th power supply 411(n) and one or more energy storage components 413(n) of the n'th SMDCTDC(n) 410(n). The one or more energy storage components 413(n) are coupled to an n'th output port 416(n) to provide an output voltage. SMDCTDC(n) 410(n) also has an n'th controller 418(n) that is connected to an n'th voltmeter 417(n) and controls the n'th switch 412(n).

FIG. 9 illustrates the N switched mode DC to DC converters as connected in parallel to each other via coupling elements 402 to provide output voltage 406 to load 404.

FIG. 10

Figure 10:
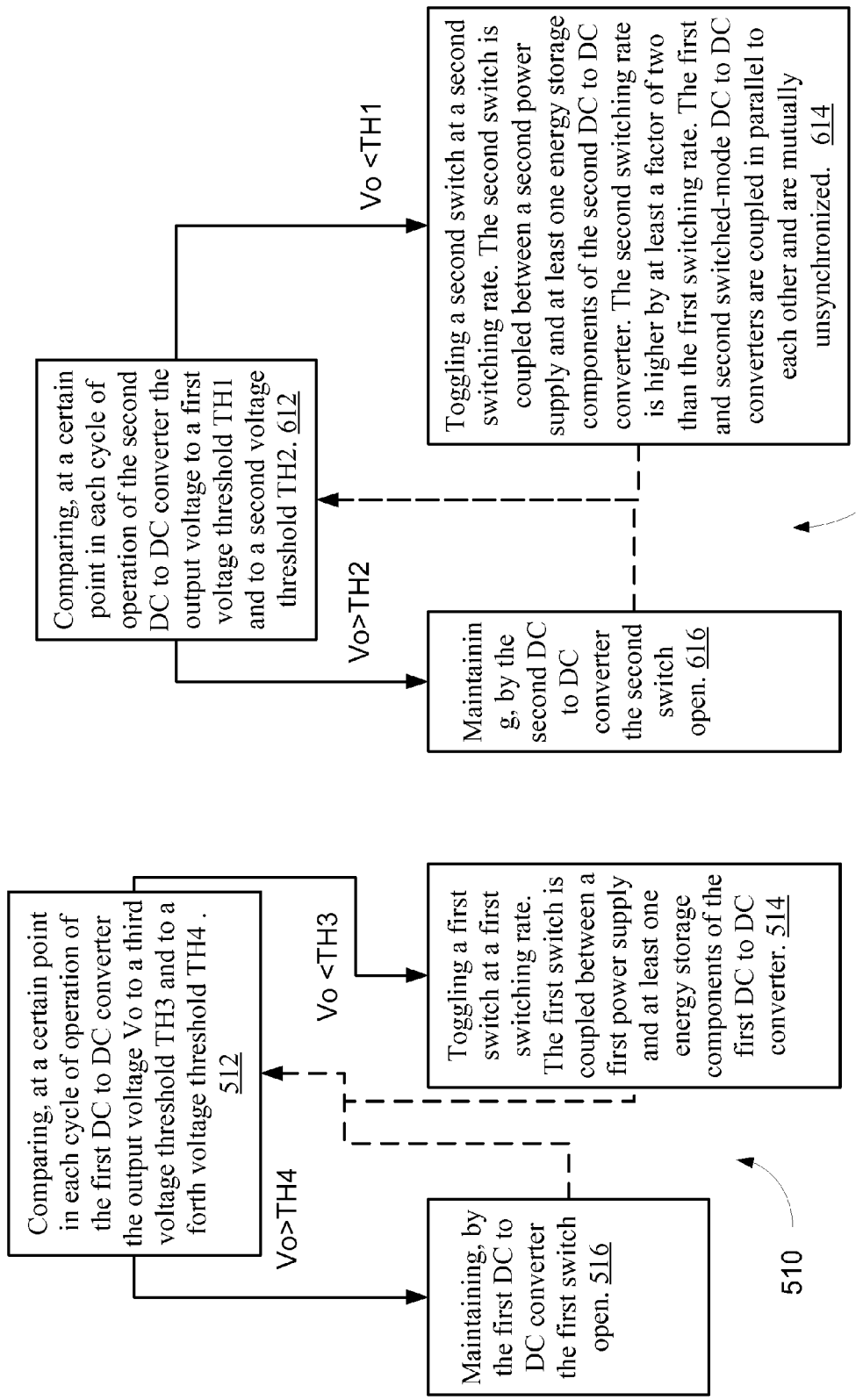
FIG. 10 illustrates a method according to an embodiment of the invention.

FIG. 10 illustrates method 500 for providing an output voltage to a load, according to an embodiment of the invention.

Method 500 includes a repetitive sequence of operations 510 executed by a first switched mode DC to DC converter and a repetitive sequence of operations 520 executed by a second switched mode DC to DC converter. These sequences are executed in an unsynchronized manner.

Sequence 510 is repeated each cycle of operation of the first DC to DC converter and includes:

a. Comparing, (512) at a certain point in the cycle of operation of the first DC to DC converter the output voltage to a third voltage threshold and to a forth voltage threshold. The comparison can be done in parallel or in a sequential manner (in which one or both comparisons are made). The certain point can be the beginning of the cycle but this is not necessarily so.

b. If, according to the comparison, the output voltage is below a third voltage threshold (at the certain point of time during the cycle of operation of the first DC to DC converter) then stage 512 is followed by stage 514 of toggling a first switch at a first switching rate. The first switch is coupled between a first power supply and at least one energy storage components of the first DC to DC converter.

c. If, according to the comparison, the output voltage is above a forth voltage threshold (at the certain point of time during the cycle of operation of the first DC to DC converter) then stage 512 is followed by stage 516 of maintaining, by the first DC to DC converter the first switch open.

d. Stages 514 and 516 are followed by stage 512.

Sequence 610 is repeated each cycle of operation of the second DC to DC converter and includes:

a. Comparing, (612) at a certain point in the cycle of operation of the second DC to DC converter the output voltage to a first voltage threshold and to a second voltage threshold. The comparison can be done in parallel or in a sequential manner (in which one or both comparisons are made). The certain point can be the beginning of the cycle but this is not necessarily so.

b. If, according to the comparison, the output voltage is below a first voltage threshold (at the certain point of time during the cycle of operation of the second DC to DC converter) then stage 612 is followed by stage 614 of toggling a second switch at a second switching rate. The second switch is coupled between a second power supply and at least one energy storage components of the second DC to DC converter.

c. If, according to the comparison, the output voltage is above a second voltage threshold (at the certain point of time during the cycle of operation of the second DC to DC converter) then stage 612 is followed by stage 616 of maintaining, by the second DC to DC converter the second switch open.

d. Stages 614 and 616 are followed by stage 612.

The second switching rate is higher by at least a factor of two than the first switching rate. The first and second switched-mode DC to DC converters are coupled in parallel to each other and are mutually unsynchronized.

Figure 11:
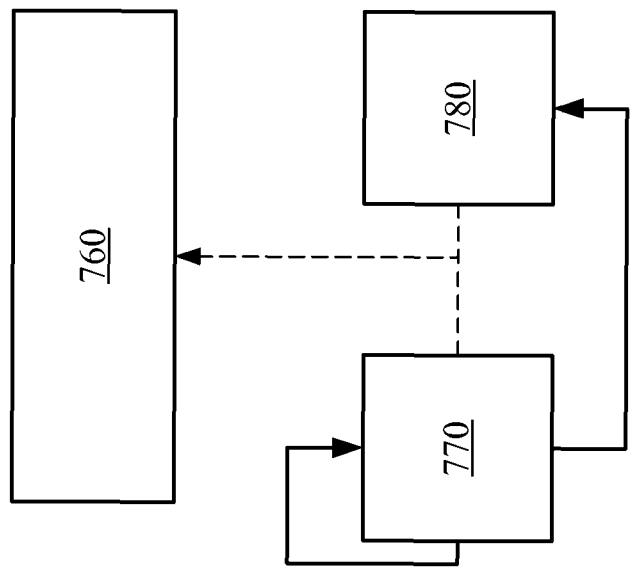
FIG. 11 illustrates a method according to an embodiment of the invention.
Figure 11:
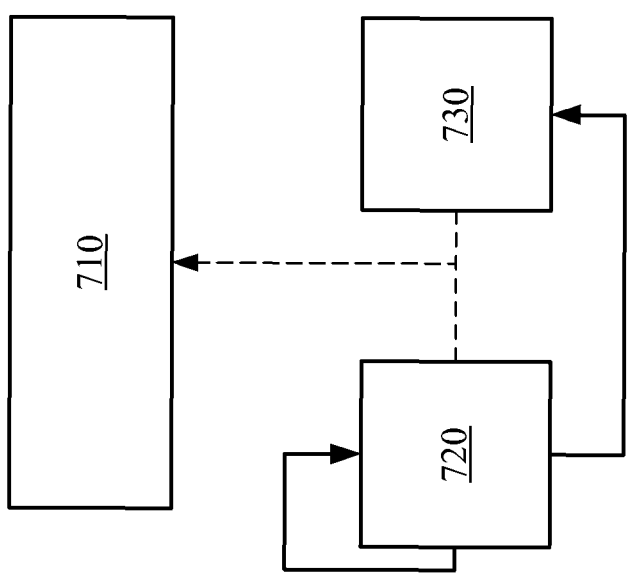

FIG. 11 illustrates method 700 according to an embodiment of the invention.

Method 700 includes two unsynchronized sets of stages. It may start by stages 710 and 760.

Stage 710 may include performing, by a first DC to DC converter, a DC to DC conversion of an input voltage to provide an output voltage—both are DC voltages.

Stage 710 is controlled by stage 720 and 730 that determine the manner in which the DC to DC conversion occurs—by setting a parameter of the DC to DC conversion of stage 710. The parameter can include . . . [PLEASE ADD]

Stage 720 includes determining, by a first direct current (DC) to DC converter, at a first determination rate whether to alter a parameter of operation of the first DC to DC converter. The determination may be responsive to a value of the output voltage. If it is determined to alter the parameter then stage 720 is followed by stage 730 of altering the parameter of operation of operation of the first DC to DC converter in response to the determination. Else—stage 720 is followed by itself.

Stage 720 may include, for example, stage 512 of FIG. 6.

Stage 760 may include performing a DC to DC conversion, by a second DC to DC converter, of an input voltage to provide an output voltage—both are DC voltages.

Stage 760 is controlled by stage 770 and 780 that determine the manner in which the DC to DC conversion occurs—by setting a parameter of the DC to DC conversion of stage 760.

Stage 770 includes determining, by a second direct current (DC) to DC converter, at a second determination rate whether to alter a parameter of operation of the second DC to DC converter. The determination may be responsive to a value of the output voltage. If it is determined to alter the parameter then stage 770 is followed by stage 780 of altering the parameter of operation of operation of the second DC to DC converter in response to the determination. Else—stage 770 is followed by itself.

Stage 770 may include, for example, stage 612 of FIG. 6.

The second determination rate is higher by at least a factor of two than the first determination. The first and second DC to DC converters are coupled in parallel to each other and are mutually unsynchronized.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A system comprising: a first switched-mode direct current to direct current (DC) converter that is arranged to selectively toggle a first switch at a first switching rate; wherein the first switch is coupled between a first power supply and energy storage components of the first DC to DC converter; a second switched-mode DC to DC converter that is arranged to selectively toggle a second switch at a second switching rate; wherein the second switch is coupled between a second power supply and energy storage components of the second DC to DC converter; wherein the second switching rate is higher by at least a factor of two than the first switching rate;

wherein the first and second switched-mode DC to DC converters are mutually unsynchronized;

wherein when the first and second DC to DC converters are coupled in parallel to each other to provide an output voltage; wherein the second DC to DC converter is arranged to execute, per each cycle of operation of the second DC to DC converter: toggle the second switch at the second switching rate if at a certain point of the cycle of operation of the second DC to DC converter the output voltage is below a first voltage threshold; and maintain the second switch open if at the certain point of the cycle of operation of the second DC to DC converter the output voltage is above a second voltage threshold;

wherein the first DC to DC converter is arranged to execute, per each cycle of operation of the first DC to DC converter: toggle the first switch at the first switching rate if at a certain point of the cycle of operation of the first DC to DC converter the output voltage is below a third voltage threshold; and maintain the first switch open if at the certain point of the cycle of operation of the first DC to DC converter the output voltage is above a forth voltage threshold; wherein the first voltage threshold does not exceed the third voltage threshold.

2. The system according to claim 1, wherein the second switching rate is higher by at least a factor of four than the first switching rate.

3. The system according to claim 1, wherein the second switching rate is higher by at least a factor of five than the first switching rate.

4. The system according to claim 1, wherein the first voltage threshold equals the second voltage threshold.

5. The system according to claim 1, wherein the first voltage threshold differs from the second voltage threshold wherein the first DC to DC converter is arranged to execute, per each cycle of operation of the first DC to DC converter: toggle the first switch at the first switching rate if at a certain point of the cycle of operation of the first DC to DC converter the output voltage is below a third voltage threshold; and maintain the first switch open if at the certain point of the cycle of operation of the first DC to DC converter the output voltage is above a forth voltage threshold; wherein the first voltage threshold does not exceed the third voltage threshold.

6. The system according to claim 1 wherein the first voltage threshold is lower than the third voltage threshold.

7. The system according to claim 1 wherein the first voltage threshold equals the third voltage threshold.

8. The system according to claim 1 wherein the second voltage threshold is lower than the fourth voltage threshold.

9. The system according to claim 1 wherein the second voltage threshold equals the fourth voltage threshold.

10. The system according to claim 1, comprising a third switched-mode DC to DC converter, wherein the third switched-mode DC to DC converter is arranged to selectively toggle a third switch at a third switching rate; wherein the third switch is coupled between a third power supply and third energy storage components of the third DC to DC converter; wherein the third switching rate is higher by at least a factor of two than the second switching rate; and wherein the first, second and third switched-mode DC to DC converters are mutually unsynchronized.

11. A method for providing an output voltage to a load, the method comprising: for each cycle of operation of a first switched mode direct current (DC) to DC converter: toggling a first switch at a first switching rate during the cycle of operation of the first DC to DC converter if at a certain point in the cycle of operation of the first DC to DC converter the output voltage is below a third voltage threshold; wherein the first switch is coupled between a first power supply and energy storage components of the first DC to DC converter; maintaining, by the first DC to DC converter the first switch open if at the certain point in the cycle of operation of the first DC to DC converter the output voltage is above a fourth voltage threshold; for each cycle of operation of a second DC to DC converter: toggling a second switch at a second switching rate during the cycle of operation of the second DC to DC converter if at a certain point in the cycle of operation of the second DC to DC converter the output voltage is below a first voltage threshold; wherein the second switch is coupled between a second power supply and at least one energy storage components of the second DC to DC converter;

maintaining, by the second DC to DC converter the second switch open if at the certain point in the cycle of operation of the second DC to DC converter the output voltage is above a second voltage threshold; wherein the second switching rate is higher by at least a factor of two than the first switching rate; and wherein the first and second switched-mode DC to DC converters are coupled in parallel to each other and are mutually unsynchronized wherein when the first and second DC to DC converters are coupled in parallel to each other to provide an output voltage; wherein the second DC to DC converter is arranged to execute, per each cycle of operation of the second DC to DC converter: toggle the second switch at the second switching rate if at a certain point of the cycle of operation of the second DC to DC converter the output voltage is below a first voltage threshold; and maintain the second switch open if at the certain point of the cycle of operation of the second DC to DC converter the output voltage is above a second voltage threshold wherein the first DC to DC converter is arranged to execute, per each cycle of operation of the first DC to DC converter: toggle the first switch at the first switching rate if at a certain point of the cycle of operation of the first DC to DC converter the output voltage is below a third voltage threshold; and maintain the first switch open if at the certain point of the cycle of operation of the first DC to DC converter the output voltage is above a forth voltage threshold; wherein the first voltage threshold does not exceed the third voltage threshold.

12. A system comprising: a first direct current to direct current (DC) converter that is arranged to determine at a first determination rate whether to alter a parameter of operation of the first DC to DC converter and to selectively alter the parameter of operation of operation of the first DC to DC converter in response to the determination; a second switched-mode DC to DC converter that is arranged to determine at a second determination rate whether to alter the parameter of operation of the second DC to DC converter and to selectively alter the parameter of operation of operation of the second DC to DC converter in response to the determination; wherein the second determination rate is higher by at least a factor of two than the first determination rate; and wherein the first and second DC to DC converters are mutually unsynchronized wherein when the first and second DC to DC converters are coupled in parallel to each other to provide an output voltage; wherein the second DC to DC converter is arranged to execute, per each cycle of operation of the second DC to DC converter: toggle the second switch at the second switching rate if at a certain point of the cycle of operation of the second DC to DC converter the output voltage is below a first voltage threshold; and maintain the second switch open if a certain point of the cycle of operation of the second DC to DC converter the output voltage is above a second voltage threshold wherein the first DC to DC converter is arranged to execute, per each cycle of operation of the first DC to DC converter: toggle the first switch at the first switching rate if at a certain point of the cycle of operation of the first DC to DC converter the output voltage is below a third voltage threshold; and maintain the first switch open if at the certain point of the cycle of operation of the first DC to DC converter the output voltage is about a forth voltage threshold; wherein the first voltage threshold does not exceed the third voltage threshold.

13. The system according to claim 12 wherein the parameter of operation is a switching rate.

14. A method for providing an output voltage to a load, the method comprising: determining, by a first direct current (DC) to DC converter, at a first determination rate whether to alter a parameter of operation of the first DC to DC converter; selectively altering the parameter of operation of operation of the first DC to DC converter in response to the determination; determining, by a second direct current (DC) to DC converter, at a second determination rate whether to alter a parameter of operation of the second DC to DC converter; selectively altering the parameter of operation of operation of the second DC to DC converter in response to the determination; wherein the second determination rate is higher by at least a factor of two than the first determination rate; and wherein the first and second DC to DC converters are coupled in parallel to each other and are mutually unsynchronized wherein the first and second DC to DC converters are coupled in parallel to each other to provide an output voltage; wherein the second DC to DC converter is arranged to execute, per each cycle of operation of the second DC to DC converter: toggle the second switch at the second switching rate if at a certain point of the cycle of operation of the second DC to DC converter the output voltage is below a first voltage threshold; and maintain the second switch open if at the certain point of the cycle of operation of the second DC to DC converter the output voltage is above a second voltage threshold wherein the first DC to DC converter is arranged to execute, per each cycle of operation of the first DC to DC converter: toggle the first switch at the first switching rate if at a certain point of the cycle of operation of the first Dc to DC converter the output voltage is below a third voltage threshold; and maintain the first switch open if at the certain point of the cycle of operation of the first DC to DC converter the output voltage is above a forth voltage threshold; wherein the first voltage threshold does not exceed the third voltage threshold.

\* \* \* \* \*